United States Patent
Shirota

(10) Patent No.: US 8,655,509 B2
(45) Date of Patent: Feb. 18, 2014

(54) FLIGHT CONTROL SYSTEM OF AIRCRAFT

(75) Inventor: Nemu Shirota, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 154 days.

(21) Appl. No.: 13/388,319

(22) PCT Filed: Sep. 14, 2010

(86) PCT No.: PCT/JP2010/065780
§ 371 (c)(1),
(2), (4) Date: Feb. 1, 2012

(87) PCT Pub. No.: WO2011/030901
PCT Pub. Date: Mar. 17, 2011

(65) Prior Publication Data
US 2012/0130565 A1  May 24, 2012

(30) Foreign Application Priority Data

Sep. 14, 2009 (JP) ................................ 2009-212256

(51) Int. Cl.
*B64C 13/02* (2006.01)
*G05D 1/08* (2006.01)

(52) U.S. Cl.
USPC .............................. 701/3; 701/12; 244/17.13

(58) Field of Classification Search
USPC .......... 701/3, 4, 8, 12; 244/17.19, 221, 17.13, 244/178; 340/965
See application file for complete search history.

(56) References Cited

U.S. PATENT DOCUMENTS 4,279,391 A * 7/1981 Adams et al. ............... 244/17.13
4,385,355 A   5/1983 Verzella et al.
(Continued)

FOREIGN PATENT DOCUMENTS

JP 4-37838 9/1992
JP 6-41279 2/1994
(Continued)

OTHER PUBLICATIONS

International Search Report issued Oct. 12, 2010 in International (PCT) Application No. PCT/JP2010/065780.
(Continued)

*Primary Examiner* — Tan Q Nguyen
(74) *Attorney, Agent, or Firm* — Wenderoth, Lind & Ponack, L.L.P.

(57) ABSTRACT

A flight control system of an aircraft and a flight control method of the aircraft are provided in which the overrunning an operation limitation on a flight condition can be prevented even when a pilot operates a flight control device fast. The flight control system of the aircraft includes a flight control device; a sensor configured to detect a first parameter changed based on a flight condition of the aircraft; a limitation flight control position calculating section configured to calculate a limitation flight control position of the flight control device when the first parameter reaches a limitation value, based on the first parameter; a reaction force generating actuator configured to change a reaction force which the pilot receives when carrying out a flight control input to the flight control device, in response to a reaction force generating command generated based on the flight control position of the flight control device and the limitation flight control position; an inner loop command calculating section configured to generate an inner loop command based on the flight control position; and a control surface actuator configured to drive a control surface of the aircraft based on the flight control position and the inner loop command.

18 Claims, 16 Drawing Sheets

(56) References Cited

U.S. PATENT DOCUMENTS

| | | | |
|---|---|---|---|
| 4,609,988 A | 9/1986 | Zweifel | |
| 5,853,152 A * | 12/1998 | Evans et al. | 244/221 |
| 6,512,344 B1 | 1/2003 | Konno et al. | |
| 7,098,811 B2 * | 8/2006 | Augustin et al. | 340/965 |
| 2003/0094539 A1 | 5/2003 | Schaeffer et al. | |

FOREIGN PATENT DOCUMENTS

| | | |
|---|---|---|
| JP | 7-8679 | 1/1995 |
| JP | 3001819 | 1/2000 |
| JP | 3046771 | 5/2000 |
| JP | 3065603 | 7/2000 |
| JP | 3091743 | 9/2000 |
| JP | 2004-516970 | 6/2004 |
| JP | 4198668 | 12/2008 |

OTHER PUBLICATIONS

Japanese Office Action mailed Dec. 10, 2013 in corresponding Japanese Patent Application No. 2009-212256 with partial English translation.

* cited by examiner

FLIGHT CONTROL SYSTEM OF AIRCRAFT

TECHNICAL FIELD

The present invention is related to a flight control system of an aircraft and a flight control method of an aircraft.

BACKGROUND ART

When controlling an aircraft, a pilot must always recognize the conditions, which always changes, of a power system and a flight control system of an aircraft. Also, the pilot must know their operation limitations in addition to the current conditions of these systems.

A mechanical spring is sometimes used in an aircraft, and a sign (cue) through the tactile sense is given a pilot through a control lever to indicate the approach to an operation limitation of the aircraft. Such a mechanical spring supplies a given resistivity in the control in connection with a preset level. The preset level cannot be changed if the spring is once installed.

Patent Literature 1 (JP 2004-516970A) discloses an aircraft power lever tactile cueing system in which the magnitude of friction force can be changed according to a given dynamic condition of the aircraft, and in which the mechanical spring is not required. In this system, the mechanical spring is replaced by computer executed software, a variable magnetic particle friction clutch, and an electronic trim motor. A power lever soft stop and a power lever back drive are used as the tactile cautions. These tactile cautions provide the tactile cues in the same manner as the spring when the power command reaches a given operation limit. A back drive command trim-downs a power lever at a variable speed based on the operation situation of the aircraft and the engine. The tactile cue is set to an operation condition until the aircraft and the engine returns to a condition in which an operation limitation is not overrun.

On the other hand, FIG. 1 discloses a conventional flight control system using an inner loop command. The flight control system is provided with a flight control device 210, a control surface actuator 230, a swash plate 240, a control surface 250, an inner loop actuator 260, a rate gyro 270, and an inner loop command calculating section 280. The control surface actuator 230 is connected with the flight control device 210 through the inner loop actuator 260 and is connected with the control surface 250 through the swash plate 240. The control surface actuator 230 drives the control surface based on the flight control position of the flight control device 210. Here, the rate gyro 270 detects an attitude change of aircraft due to the disturbance and outputs the detected attitude change to the inner loop command calculating section 280. The inner loop command calculating section 280 outputs an inner loop command based on the detected posture change. The inner loop command is a command to increase or decrease a command amount which is given to the control surface actuator 230 without a change of the flight control position of the flight control device 210 by the pilot. The inner loop actuator 260 drives the control surface 250 through the control surface actuator 230 based on the inner loop command. Therefore, even if the flight control position of the flight control device 210 is maintained to be constant without fine correction by a pilot, it is prevented that the aircraft is made unstable due to the disturbance.

CITATION LIST

[Patent Literature 1: JP 2004-516970A

SUMMARY OF THE INVENTION

One subject matter of the present invention is to provide a flight control system of an aircraft and a flight control method of the aircraft, in which the overrunning an operation limitation on a flight condition is prevented even when a pilot operates a flight control device fast.

The flight control system of the aircraft according to the present invention includes a flight control device; a sensor configured to detect a first parameter changed based on a flight condition of the aircraft; a limitation flight control position calculating section configured to calculate a limitation flight control position of the flight control device when the first parameter reaches a limitation value, based on the first parameter; a reaction force generating command calculating section configured to generate a reaction force generating command based on a flight control position of the flight control device and the limitation flight control position; a reaction force generating actuator configured to change a reaction force which a pilot receives when carrying out a flight control input to the flight control device, in response to the reaction force generating command; an inner loop command calculating section configured to generate an inner loop command based on the flight control position; and a control surface actuator configured to drive a control surface of the aircraft in response to a control surface command obtained from the flight control position and the inner loop command.

The inner loop command calculating section generates the inner loop command to depend on a time change rate of the flight control position. The control surface actuator drives the control surface such that a drive amount of the control surface decreases when the flight control position is changed quickly.

The flight control system further includes an inner loop actuator configured to operate in response to the inner loop command. The control surface actuator drives the control surface in response to the flight control position and an output displacement of the inner loop actuator.

The flight control system of the aircraft is further provided with a flight control calculating section and a control surface command calculating section. The flight control calculating section generates a flight control command based on the flight control position. The control surface command calculating section generates the control surface command by subtracting the inner loop command from the flight control command. The control surface actuator drives the control surface in response to the control surface command.

The sensor detects a plurality of parameters which contains the first parameter. The plurality of parameters changes based on the flight condition. The limitation flight control position calculating section calculates the limitation flight control position based on a table which indicates a relation of a combination of values of the plurality of parameters and the limitation flight control position.

The limitation flight control position calculating section calculates the flight control position change amount based on a difference between the limitation value and the first parameter, and a rate of a change amount of the first parameter to a change amount of the flight control position, and calculates the limitation flight control position based on the flight control position change amount and the flight control position.

The sensor further detects the plurality of parameters other than the first parameter. The plurality of parameters change based on the flight condition. The limitation flight control position calculating section calculates the flight control position change amount based on the difference, the plurality of parameters, and a table which indicates a relation of a combination of values of the plurality of parameters and the rate.

The sensor further detects the plurality of parameters other than the first parameter. The plurality of parameters change based on the flight condition. The limitation flight control position calculating section calculates a first parameter prediction value as a prediction value of the first parameter after a given prediction time, calculates the flight control position change amount based on a difference between the limitation value and the first parameter prediction value, the plurality of parameters, and a table which indicates a relation of a combination of values of the plurality of parameters, and a rate of a change amount of the first parameter to a change amount of the flight control position, and calculates the limitation flight control position based on the flight control position change amount and the flight control position.

The sensor further detects the plurality of parameters other than the first parameter. The plurality of parameters change based on the flight condition. The limitation flight control position calculating section calculates a first parameter prediction value as a prediction value of the first parameter after a given prediction time, calculates a first parameter correction value as a correction value of the first parameter prediction value based on the first parameter prediction value, the first parameter, a buffer in which the prediction time is set as a retention time, and a filter, calculates the flight control position change amount based on a difference between the limitation value and the first parameter correction value, the plurality of parameters, and a table which indicates a relation of a combination of values of the plurality of parameters and a rate of a change amount of the first parameter to a change amount of the flight control position, and calculates the limitation flight control position based on the flight control position change amount and the flight control position.

A flight control method of an aircraft, includes: a step of detecting by a sensor, a first parameter of a plurality of parameters changed based on a flight condition of the aircraft at least; a step of calculating a limitation flight control position of a flight control device when the first parameter reaches a limitation value, based on the detection result of the sensor; a step of generating a reaction force generating command based on the flight control position of the flight control device and the limitation flight control position; a step of changing reaction force received by a pilot carrying out a flight control input to the flight control device, in response to the reaction force generating command; a step of generating an inner loop command based on the flight control position; and a step of driving a control surface of the aircraft in response to the control surface command obtained from the flight control position and the inner loop command.

The step of generating an inner loop command includes: a step of generating the inner loop command to depend on a time change rate of the flight control position. The step of driving the control surface includes a step of driving the control surface such that a drive amount of the control surface decreases when the flight control position is changed quickly.

The flight control device is connected with the control surface through the inner loop actuator and the control surface actuator. The step of driving a control surface includes: a step of driving the inner loop actuator in response to the inner loop command; and a step of driving the control surface by the control surface actuator in response to the control surface command obtained from an output displacement as the operation result of the inner loop actuator and the flight control position.

The flight control method further includes: a step of generating a flight control command based on the flight control position; and a step of generating the control surface command by subtracting the inner loop command from the flight control command. The step of driving the control surface includes a step of driving the control surface in response to the control surface command.

The step of detecting includes a step of detecting the plurality of parameters which contain the first parameter. The plurality of parameters change based on the flight condition. The step of calculating a limitation flight control position includes: a step of calculating the limitation flight control position based on a table which indicates a relation of a combination of values of the plurality of parameters and the limitation flight control position.

The step of calculating a limitation flight control position includes: a step of calculating a flight control position change amount based on a difference of the limitation value and the first parameter, and a rate of a change amount of the first parameter to a change amount of the flight control position; and a step of calculating the limitation flight control position based on the flight control position change amount and the flight control position.

The flight control method further includes a step of detecting the plurality of parameters other than the first parameter. The plurality of parameters change based on the flight condition. The step of calculating a flight control position change amount includes: a step of calculating the flight control position change amount based on the difference, the plurality of parameters, and a table which indicates a relation of a combination of values of the plurality of parameters and the rate.

The flight control method further includes a step of detecting the plurality of parameters other than the first parameter. The plurality of parameters change based on the flight condition. The step of calculating a limitation flight control position includes: a step of calculating a first parameter prediction value as a prediction value of the first parameter after a given prediction time; a step of calculating a flight control position change amount based on a difference between the limitation value and the first parameter prediction value, the plurality of parameters, and a table which indicates a relation of a combination of values of the plurality of parameters and a rate of a change amount of the first parameter to a change amount of the flight control position; and a step of calculating the limitation flight control position based on the flight control position change amount and the flight control position.

The flight control method further includes a step of detecting the plurality of parameters other than the first parameter. The plurality of parameters change based on the flight condition. The step of calculating a limitation flight control position includes: a step of calculating of a first parameter prediction value as a prediction value of the first parameter after a given prediction time; a step of calculating a first parameter correction value as a correction value of the first parameter prediction value based on the first parameter prediction value, the first parameter, a buffer in which the prediction time is set as a retention time, and a filter; a step of calculating the flight control position change amount based on a difference between the limitation value and the first parameter correction value, the plurality of parameters, a table which indicates a relation of a combination of values of the plurality of parameters and a rate of a change amount of the first parameter to a change amount of the flight control position; and a step of calculating the limitation flight control position based on the flight control position change amount and the flight control position.

According to the present invention, the flight control system of the aircraft and the flight control method of the aircraft are provided, in which the overrunning the operation limitation on the flight condition is prevented even when the pilot operates the flight control device fast.

DESCRIPTION OF EMBODIMENTS

Hereinafter, a flight control system of an aircraft according to the present invention will be described in detail with reference to the attached drawings.

[First Embodiment]

Figure 1:
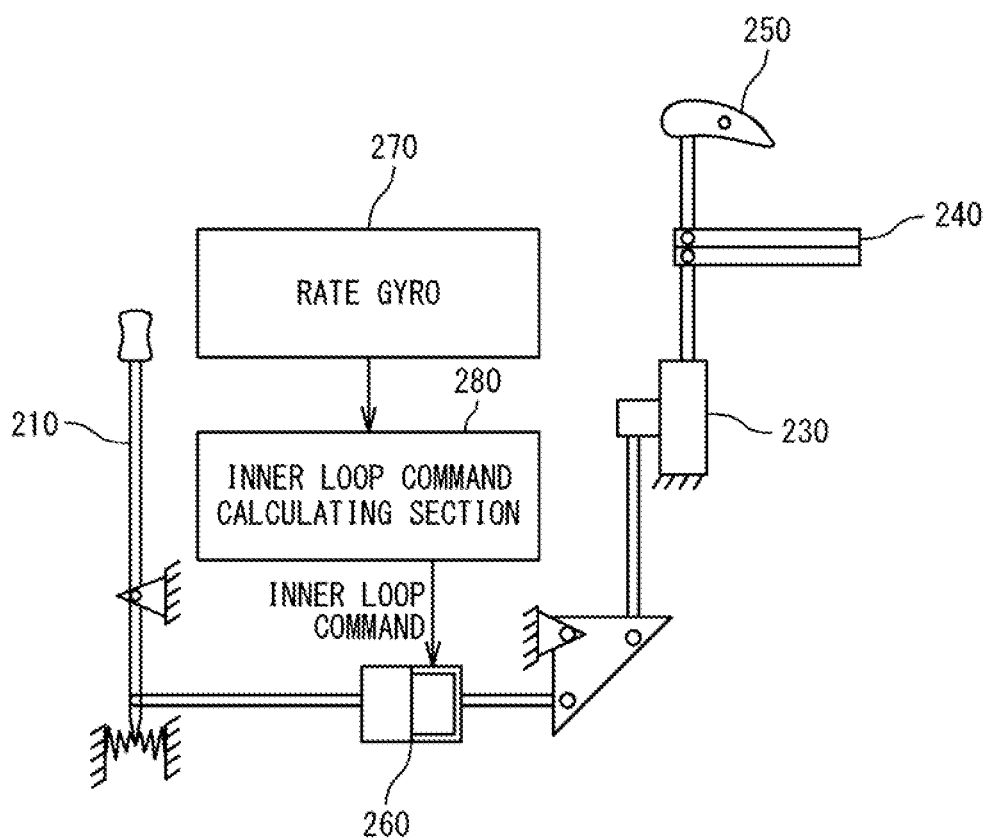
FIG. 1 is a schematic diagram showing a conventional flight control system using an inner loop command.
Figure 2:
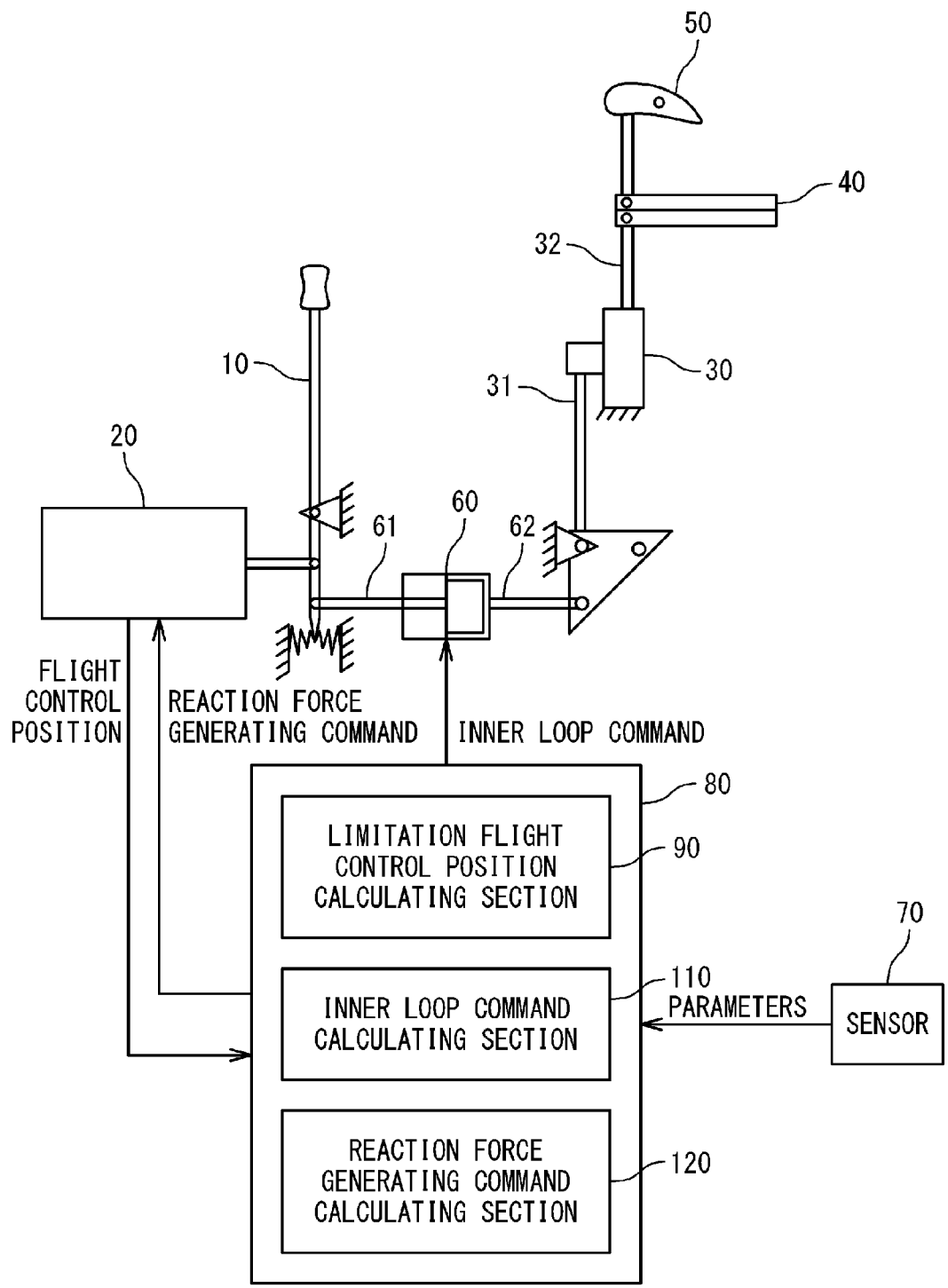
FIG. 2 is a schematic diagram showing a flight control system according to a first embodiment of the present invention.

Referring to FIG. 2, the flight control system according to a first embodiment of the present invention will be described. The flight control system according to the present embodiment is a powered flight control system and is applied to an aircraft such as a helicopter. For example, the powered flight control system is a hydro-mechanical flight control system. The flight control system according to the present embodiment is provided with a flight control device 10, a reaction force generating actuator 20, a control surface actuator 30, a swash plate 40, a control surface 50, an inner loop actuator 60, a sensor 70, and a control unit 80. The control unit 80 is provided with a limitation flight control position calculating section 90, an inner loop command calculating section 110 and a reaction force generating command calculating section 120.

The flight control device 10 is connected with the control surface 50 through the inner loop actuator 60, the control surface actuator 30 and the swash plate 40. The inner loop actuator 60 is provided with a first part 61 and a second part 62. The control surface actuator 30 is provided with an input section 31 and an output section 32. The first part 61 is connected with the flight control device 10. The second part 62 is connected with the input section 31. The output section 32 is connected with the control surface 50 through the swash plate 40.

The sensor 70 detects parameters at least indicative of the aircraft dynamics changed depending on a flight condition of the aircraft and outputs a parameter signal indicative of the detected parameters to the control unit 80. The reaction force generating actuator 20 detects a flight control position of the flight control device 10 and outputs a flight control position signal indicative of the detected flight control position to the control unit 80. The control unit 80 outputs an inner loop command to the inner loop actuator 60 and outputs a reaction force generating command to the reaction force generating actuator 20. The inner loop actuator 60 operates in response to the inner loop command. Specifically, a relative position of the second part 62 to the first part 61 is changed in response to the inner loop command. The relative position of the second part 62 to the first part 61 is sometimes called an output displacement of the inner loop actuator 60. The reaction force generating actuator 20 changes a reaction force received when a pilot carries out a flight control input to the flight control device 10, in response to the reaction force generating command.

Figure 3:
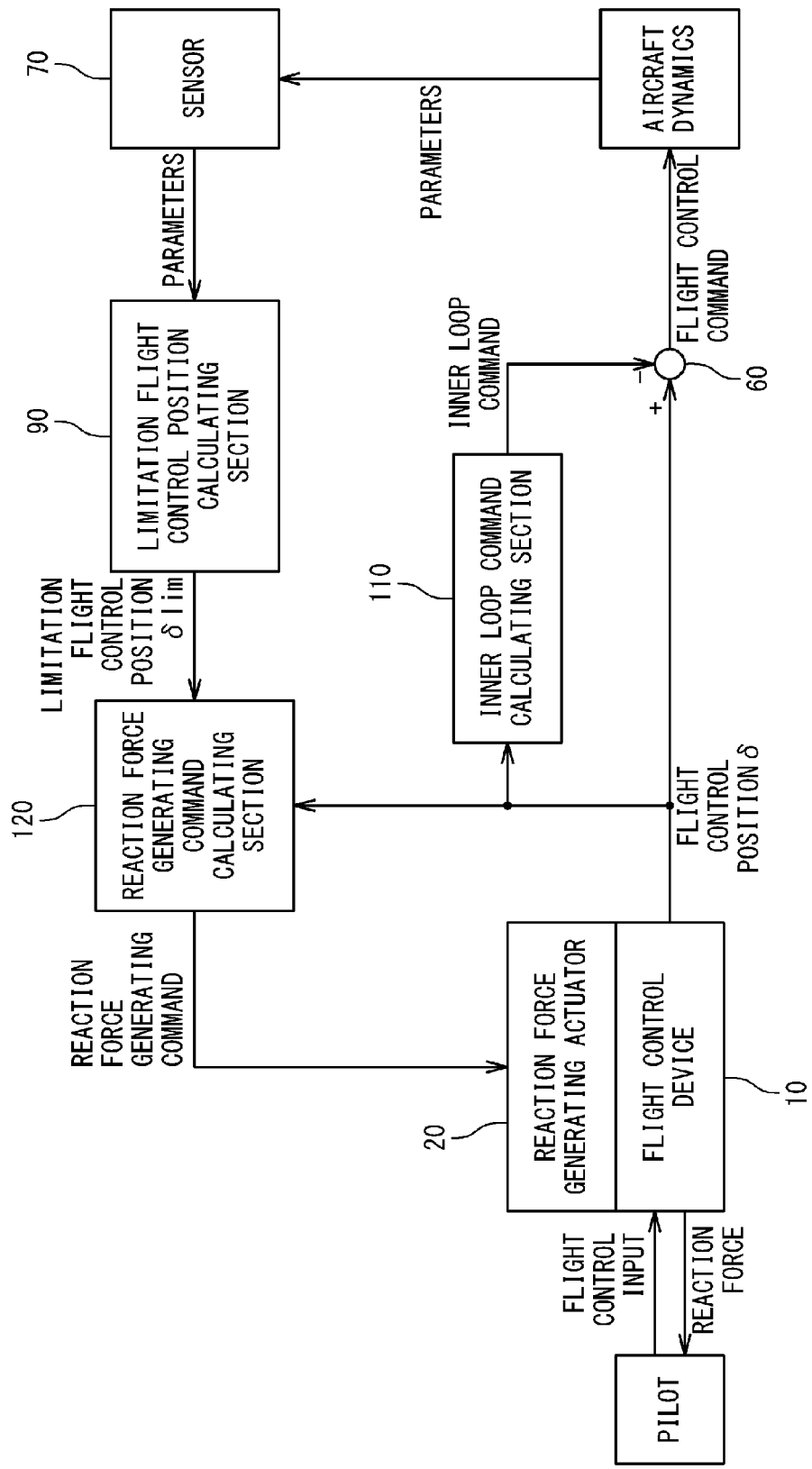
FIG. 3 is a block diagram showing the flight control system according to the first embodiment.

FIG. 3 shows a block diagram of the flight control system according to the present embodiment. The flight control position δ of the flight control device 10 changes based on a flight control input by the pilot. The inner loop command calculating section 110 generates an inner loop command in response to a flight control position signal indicative of the flight control position δ.

Figure 4:
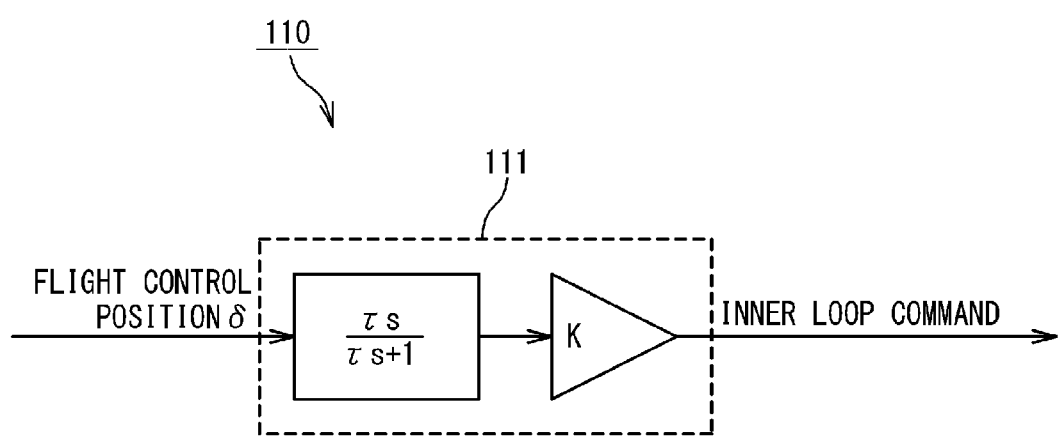
FIG. 4 is a block diagram showing an inner loop command calculating section.

Referring to FIG. 4, the inner loop command calculating section 110 is provided with a high pass filter 111. The inner loop command is equivalent to the output of the high pass filter 111 which receives the flight control position signal indicative of the flight control position δ as an input. More specifically, the inner loop command is obtained by multiplying an output of a transfer function $G_{111}(s)$ which receives the flight control position signal as an input by a gain K. The transfer function $G_{111}(s)$ is expressed by the following equation (1), supposing that a time constant is τ. In this way, the inner loop command which depends on a time change rate of the flight control position δ is generated.

$$G_{111}(s) = \frac{\tau s}{\tau s + 1} \quad (1)$$

Referring to FIG. 3 again, the inner loop actuator 60 operates in response to the inner loop command and the output of the inner loop actuator 60 is displaced. The position of the second part 62 is determined by synthesizing the output displacement of the inner loop actuator 60 based on the inner loop command to the position of the first part 61 through subtraction. The control surface actuator 30 drives the control surface 50 based on the position of the second part 62 as the flight control command. Because the first part 61 interlocks the flight control position δ, the control surface actuator 30 drives the control surface 50 based on the flight control position δ and the output displacement of the inner loop actuator

60. That is, the control surface actuator 30 drives the control surface 50 based on the flight control position δ and the inner loop command.

The sensor 70 detects the parameters of aircraft dynamics changed depending on the flight condition of the aircraft and outputs a parameter signal indicative of the detected parameters. Here, the parameters include an engine torque, a bank angle, a forward speed, a lateral speed, and the number of rotations of a main rotor. In the present embodiment, the sensor 70 detects a plurality of parameters A to C. Here, the parameter A undergoes influence by the control surface 50. The limitation flight control position calculating section 90 calculates the limitation flight control position $\delta_{lim}$ of the flight control device 10 when the parameter A reaches a limitation value, based on a parameter signal indicative of the parameters A to C.

Figure 5:
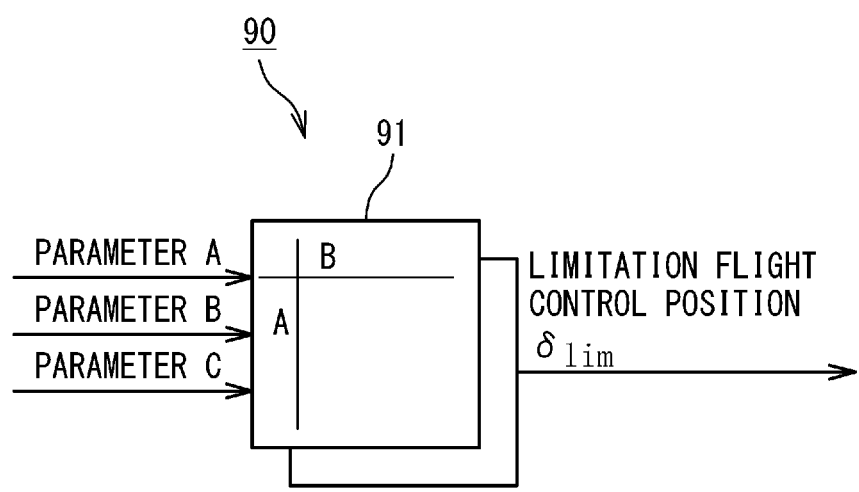
FIG. 5 is a block diagram showing a limitation flight control position calculating section.

Referring to FIG. 5, the limitation flight control position calculating section 90 is provided with a table 91 which shows a relation of a combination of values of the parameters A to C and the limitation flight control position $\delta_{lim}$. The limitation flight control position calculating section 90 determines the limitation flight control position $\delta_{lim}$ based on the table 91. Such a calculating method of the limitation flight control position $\delta_{lim}$ is effective when the limitation flight control position $\delta_{lim}$ depends on the parameters B and C in addition to the parameter A.

Figure 6:
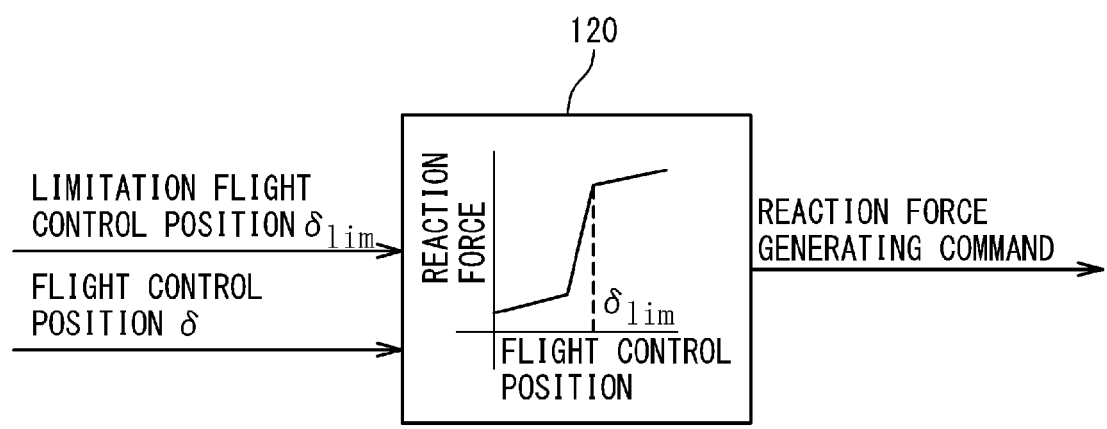
FIG. 6 is a block diagram showing a reaction force generating command calculating section.

Referring to FIG. 6, the reaction force generating command calculating section 120 generates a reaction force generating command indicative of the reaction force which the pilot receives from the flight control device 10, based on the flight control position signal indicative of the flight control position δ and the limitation flight control position $\delta_{lim}$. The reaction force generating command is generated such that the reaction force becomes large suddenly when the flight control position δ approaches the limitation flight control position $\delta_{lim}$.

Referring to FIG. 3, the reaction force generating actuator 20 changes the reaction force received when the pilot carries out a flight control input to the flight control device 10, in response to the reaction force generating command.

Figure 7:
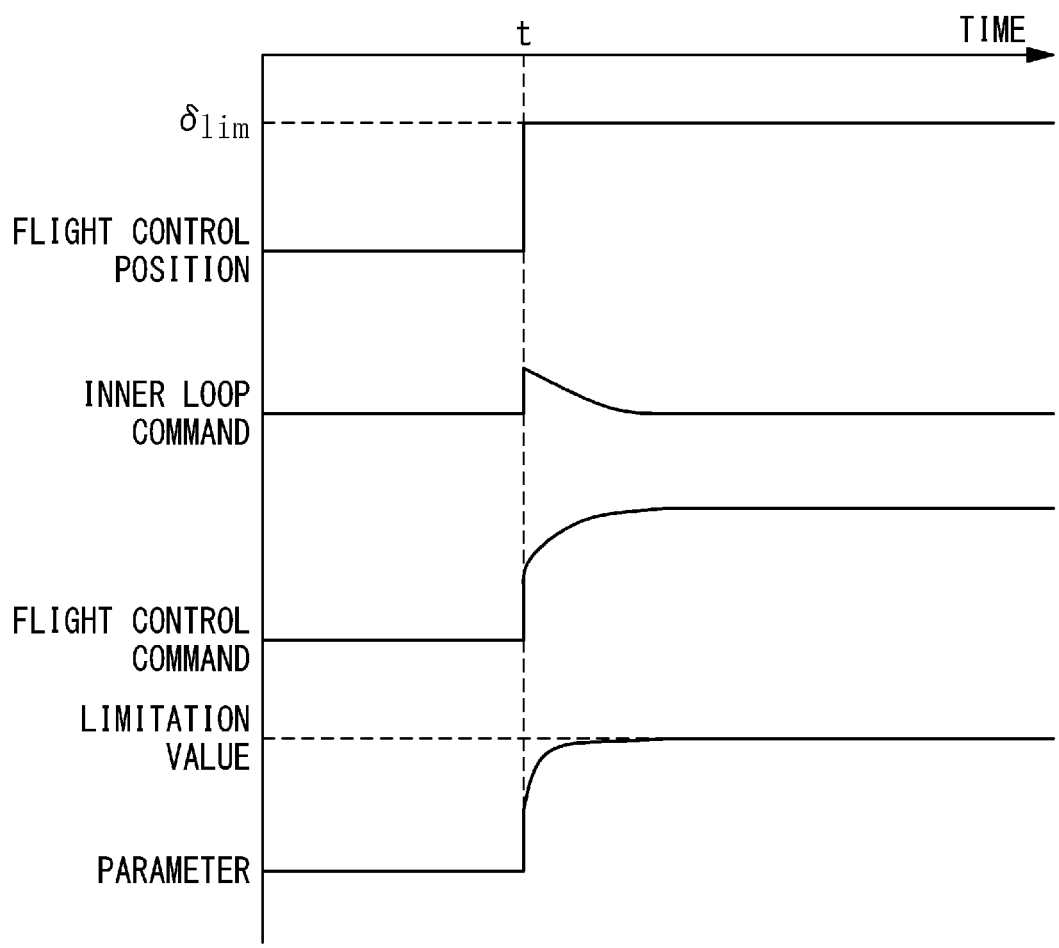
FIG. 7 shows timing charts in the operation of the flight control system according to the first embodiment.

Referring to FIG. 7, the flight control system of the aircraft and the flight control method of the aircraft according to the present embodiment will be described. FIG. 7 shows changes of the flight control position δ, the inner loop command, the flight control command and the parameter A which undergoes influence by the control surface 50, when through the flight control input by the pilot, the flight control position δ is maintained to be constant before time t, is changed (increased) to the limitation flight control position $\delta_{lim}$ fast at time t and then is maintained to be constant. In the present embodiment, the flight control command is the position of the second part 62.

The pilot recognizes the limitation flight control position $\delta_{lim}$ based on the change of the reaction force received from the flight control device 10. After the flight control position δ reaches the limitation flight control position $\delta_{lim}$, the pilot maintains the flight control position δ to the limitation flight control position $\delta_{lim}$.

The inner loop command is maintained to be a constant value (e.g. zero) before time t and is changed (increased) fast and quickly at time t, and then gradually approaches the value previous to the time t.

Because the output displacement of the inner loop actuator 60 based on the inner loop command is synthesized to the position of the first part 61 in a subtraction manner, the flight control command as the position of the second part 62 is maintained to be constant before the time t, is changed to the position corresponding to the limitation flight control position $\delta_{lim}$ after the time t, and then is maintained to the position corresponding to the limitation flight control position $\delta_{lim}$. Here, the change of the position of the second part 62 after the time t is gentle, compared with the change of the flight control position δ at the time t.

The parameter A is maintained to be a constant value before the time t, is changes to a limitation value after the time t and then is maintained to be constant at the limitation value. In the present embodiment, the control surface actuator 30 drives the control surface 50 in response to the inner loop command which is based on the flight control position δ. For example, in response to the inner loop command which depends on the time change rate of the flight control position δ, the control surface actuator 30 drives the control surface 50 such that a drive amount of the control surface 50 decrease when the flight control position δ is changed fast and quickly. Therefore, it is prevented that the parameter A exceeds the limitation value in a transient response. In the present embodiment, because the pilot maintains the flight control position δ of the flight control device 10 to the limitation flight control position $\delta_{lim}$ based on the reaction force change, the parameter A is maintained to be constant to the limitation value in the steady-state response. Because it is prevented that the parameter A exceeds the limitation value in the transient response, it is prevented that the aircraft becomes unstable. Moreover, because the parameter A is maintained to be constant to the limitation value in the steady-state response, the operation becomes possible to utilize the performance of the aircraft at maximum.

It should be noted that if the same effect as the above-mentioned effect is attained, the inner loop command may be generated based on an algorithm which is different from the algorithm shown in FIG. 4.

Figure 8:
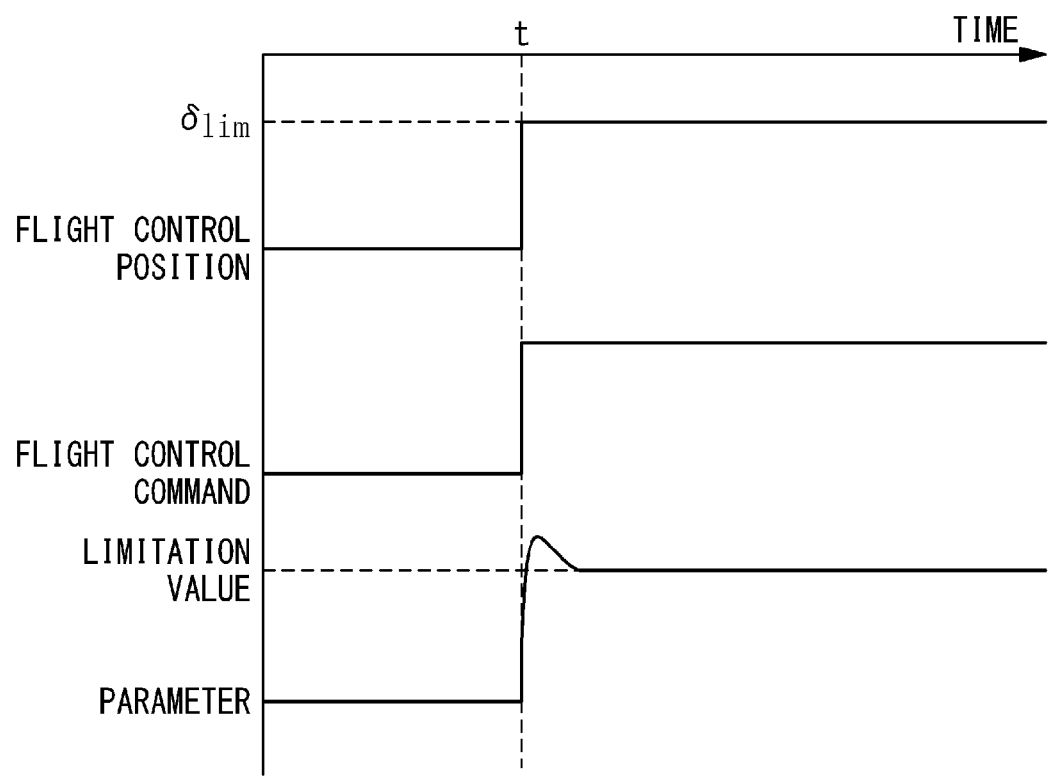
FIG. 8 shows timing charts in the operation of a flight control system according to a first comparison example.

Referring to FIG. 8, in order to make the above-mentioned effect clearer, changes of the flight control position δ, the flight control command as the position of the second part 62 and the parameter A which undergoes influence by the control surface 50 will be described in a first comparison example. In the first comparison example, a relative position of the second part 62 to the first part 61 is fixed by invalidating the inner loop command. The flight control position δ changes as in FIG. 7. Because the relative position of the second part 62 to the first part 61 is fixed, the position of the second part 62 is interlocked with the flight control position δ. Therefore, the flight control command as the position of the second part 62 is maintained to be constant before the time t, is changed to a position fast at the time t, and then is maintained to be constant to the position. The parameter A is maintained to be a constant value before the time t, is changed suddenly at the time t so as to exceed the limitation value temporarily to take a maximum, then decreases to the limitation value, and is maintained to be constant to the limitation value. In the first comparison example, because the parameter A exceeds the limitation value in the transient response, the aircraft becomes unstable.

Figure 9:
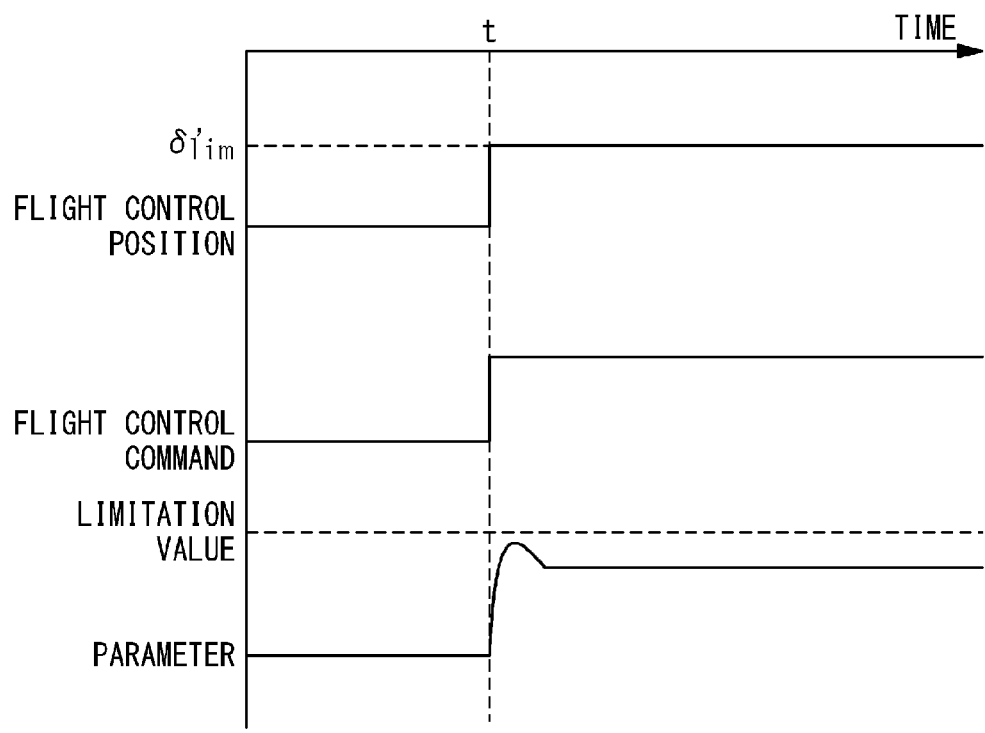
FIG. 9 shows timing charts in the operation of a flight control system according to a second comparison example.

Referring to FIG. 9, in order to make the above-mentioned effect clearer, the changes of the flight control position δ, the flight control command as the position of the second part 62 and the parameter A which undergoes influence by the control surface 50 will be described in a second comparison example. In the second comparison example, a relative position of the second part 62 to the first part 61 is fixed by invalidating the inner loop command. Moreover, the limitation flight control position calculation section 90 calculates the limitation flight control position $\delta_{lim}$, instead of the limitation flight control position $\delta_{lim}$. Here, the limitation flight control position $\delta_{lim}$, is set in such a manner that the parameter A does not exceed the limitation value at the maximum in the transient response. In this case, by the flight control input, the pilot maintains the flight control position δ to be constant before the time t, changes the flight control position δ to the limitation flight control position $δ_{lim}$, fast at the time t, and then maintains to be constant. Because the relative position of the second part 62 to the first part 61 is fixed, the position of the second part 62 in interlocked with the flight control position δ. Therefore, the flight control command as the position of the second part 62 is maintained to be constant before the time t, is changed fast to a position at time t and then is maintained to be constant to the position. A change amount of the flight control command shown in FIG. 9 at the time t is smaller than the change amount of the flight control command shown in FIG. 8 at the time t. The parameter A is maintained to a constant value before the time t, is changed suddenly at the time t so as to reach the neighborhood of the limitation value, is returned slightly toward a constant value previous to the time t, and then is maintained to a constant value. In the second comparison example, because the parameter A is maintained to be constant to a value different from the limitation value in the steady-state response, the flight control cannot be realized which utilizes the performance of the aircraft at maximum. In this way, in the example shown in FIG. 8, an overshoot occurs to exceed the limitation value of the parameter A. A change like the overshoot occurs even in an example shown in FIG. 9. However, in the present invention, the change like the overshoot does not occur and gradually approaches the limitation value.

[Second Embodiment]

Figure 10:
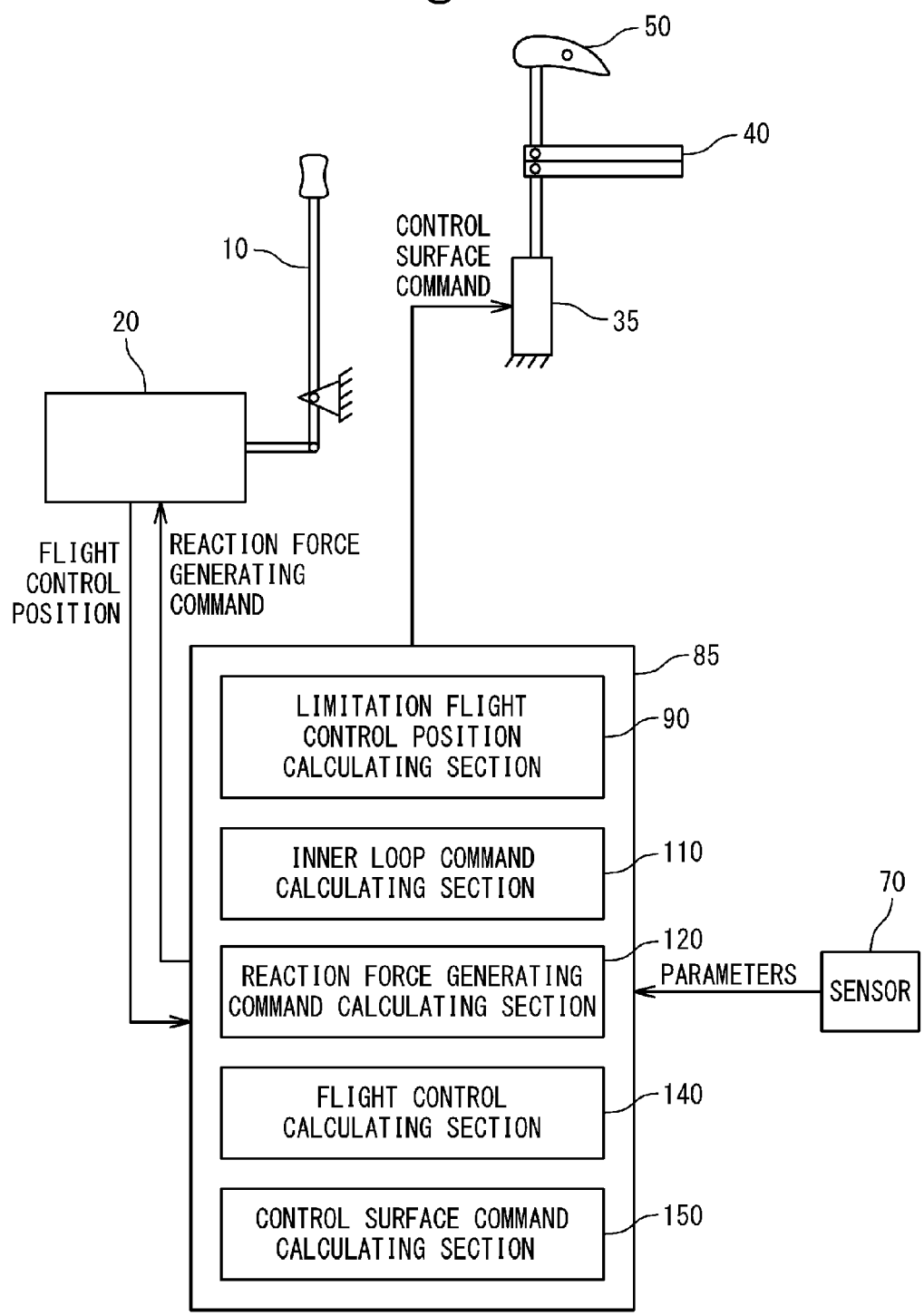
FIG. 10 is a schematic diagram of the flight control system according to a second embodiment of the present invention.

Referring to FIG. 10, the flight control system according to a second embodiment of the present invention will be described. The flight control system according to the present embodiment is a fly-by-wire flight control system and is applied to an aircraft such as a helicopter. The flight control system according to the present embodiment is provided with the flight control device 10, the reaction force generating actuator 20, a control surface actuator 35, the swash plate 40, the control surface 50, the sensor 70 and a control unit 85. The control unit 85 is provided with the limitation flight control position calculating section 90, the inner loop command calculating section 110, the reaction force generating command calculating section 120, a flight control calculating section 140 and a control surface command calculating section 150.

The control surface actuator 35 is connected with the control surface 50 through the swash plate 40.

The sensor 70 detects parameters of the aircraft dynamics changed depending on the flight condition of the aircraft and outputs a parameter signal indicative of the detected parameters to the control unit 85. The reaction force generating actuator 20 detects the flight control position of the flight control device 10 and outputs a flight control position signal indicative of the detected flight control position to the control unit 85. The control unit 85 outputs the reaction force generating command to the reaction force generating actuator 20 and outputs a control surface command as an electrical signal or a light signal to the control surface actuator 35. The reaction force generating actuator 20 changes the reaction force received when the pilot carries out a flight control input to the flight control device 10, in response to the reaction force generating command. The control surface actuator 35 drives the control surface 50 through the swash plate 40 in response to the control surface command.

Figure 11:
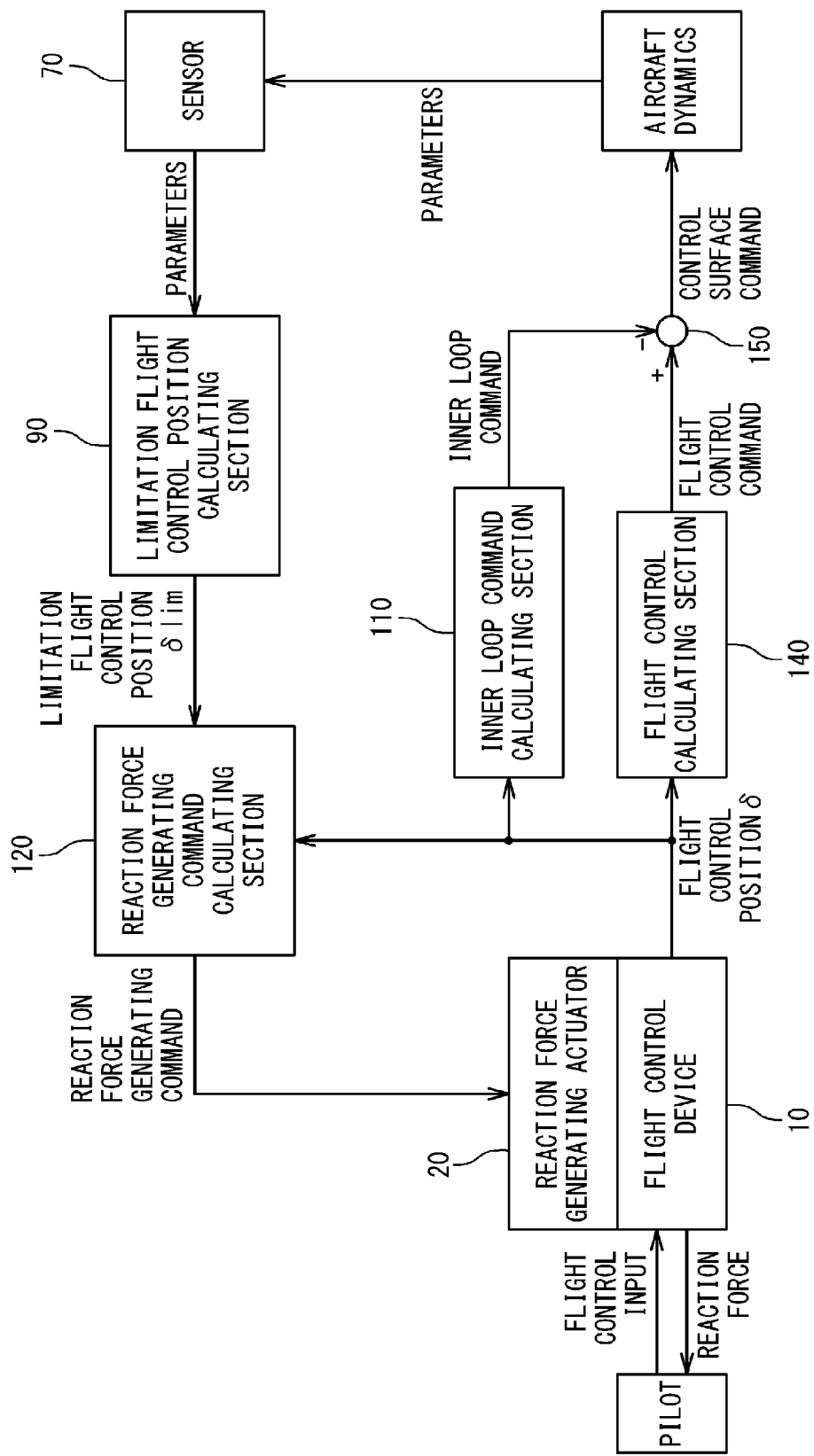
FIG. 11 is a block diagram of the flight control system according to the second embodiment.

FIG. 11 shows a block diagram of the flight control system according to the present embodiment.

The flight control input by the pilot changes the flight control position δ of the flight control device 10. The inner loop command calculating section 110 is configured in the same manner as the first embodiment. The inner loop command calculating section 110 generates the inner loop command based on the flight control position signal indicative of the flight control position δ, like the first embodiment.

The flight control calculating section 140 generates a flight control command based on the flight control position δ. For example, the control surface command calculating section 150 is a subtractor. The control surface command calculating section 150 subtracts the inner loop command from the flight control command to generate the control surface command. The control surface actuator 35 drives the control surface 50 in response to the control surface command. That is, the control surface actuator 35 drives the control surface 50 in response to the flight control command and the inner loop command.

The sensor 70 is configured in the same manner as the first embodiment. The sensor 70 detects the plurality of parameters A to C and outputs the parameter signal indicative of the detected parameters, like the first embodiment. The limitation flight control position calculating section 90 is configured in the same manner as the first embodiment. The limitation flight control position calculating section 90 calculates the limitation flight control position $δ_{lim}$ of the flight control device 10 when the parameter A reaches the limitation value, based on the parameter signal showing parameters A to C, like the first embodiment.

The reaction force generating command calculating section 120 is configured in the same manner as the first embodiment. The reaction force generating command calculating section 120 generates the reaction force generating command indicative of the reaction force which the pilot receives from the flight control device 10, based on the flight control position signal indicative of the flight control position δ and the limitation flight control position $δ_{lim}$, like the first embodiment. The reaction force generating command is generated so that the reaction force becomes large suddenly when the flight control position δ approaches the limitation flight control position $δ_{lim}$.

The reaction force generating actuator 20 changes the reaction force received when the pilot carries out a flight control input to the flight control device 10, in response to the reaction force generating command, like the first embodiment.

Figure 16:
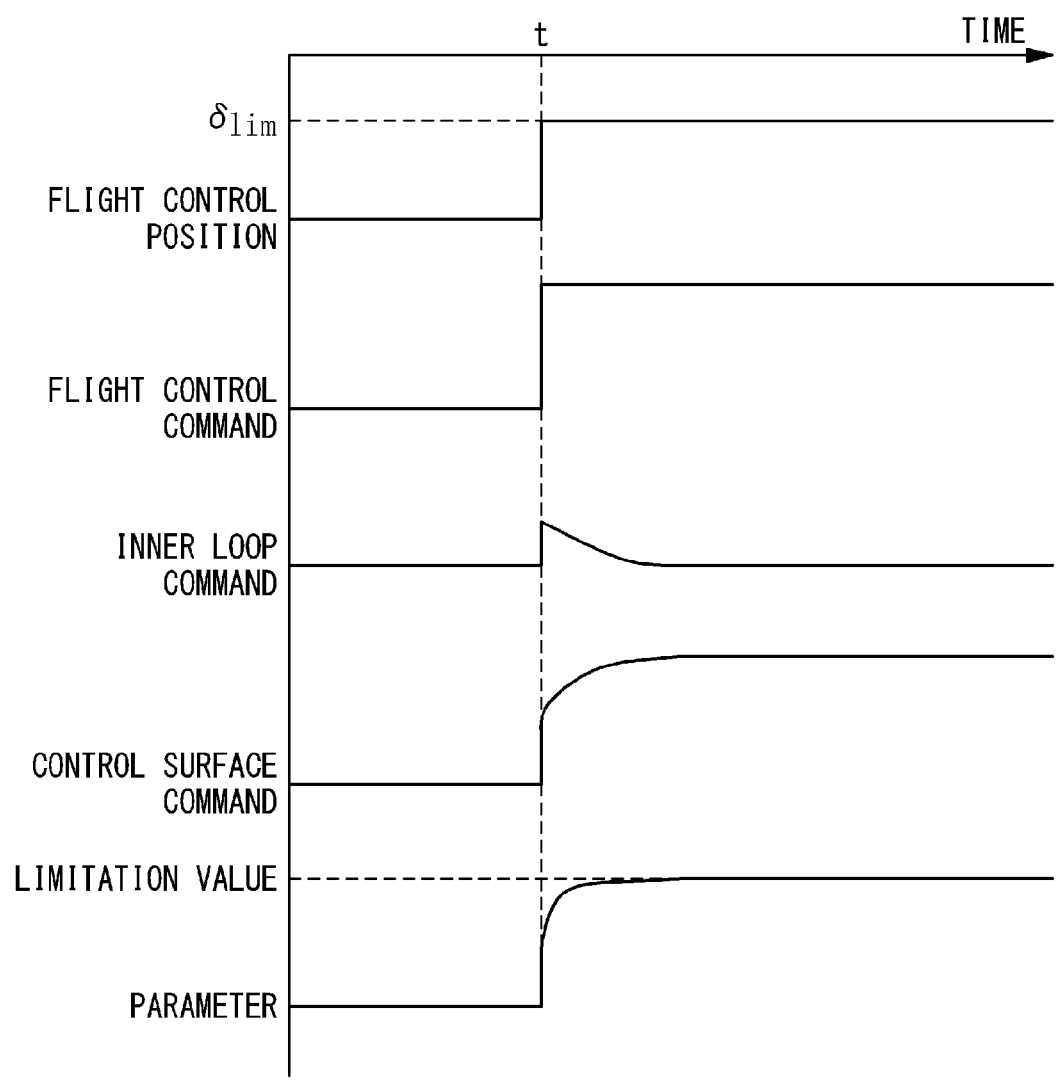
FIG. 16 shows timing charts in the operation of the flight control system according to the second embodiment.

Referring to FIG. 16, the effect of the flight control system of the aircraft and the flight control method of the aircraft according to the present embodiment will be described. FIG. 16 shows changes of the flight control position δ, the flight control command, the inner loop command, the control surface command as the electrical signal or the light signal, and the parameter A which undergoes influence of the control surface 50, when by the flight control input by the pilot, the flight control position δ is maintained to be constant before the time t, is changed (increased) to the limitation flight control position $δ_{lim}$ fast at the time t, and is then maintained to be constant.

The pilot recognizes the limitation flight control position $δ_{lim}$ based on the change of the reaction force received from the flight control device 10, and maintains the flight control position δ to the limitation flight control position $δ_{lim}$ after the flight control position δ reaches the limitation flight control position $δ_{lim}$.

The flight control command changes in the same manner as the flight control position δ. That is, the flight control command is maintained to be constant before the time t, is changed (increased) fast and quickly to a value corresponding to the limitation flight control position $\delta_{lim}$ at the time t, and then is maintained to be constant to the value corresponding to the limitation flight control position $\delta_{lim}$.

The inner loop command is maintained to a constant value (e.g. zero) before the time t, is changed (increased) fast and quickly at the time t, and then gradually approaches to the value previous to the time t.

Because the control surface command is generated by subtracting the inner loop command from the flight control command, the control surface command is maintained to be constant before the time t, is changed to the value corresponding to the limitation flight control position $\delta_{lim}$ after the time t, and then is maintained to the value corresponding to the limitation flight control position $\delta_{lim}$. Here, the change of the control surface command after the time t is gentle, compared with the changes of the flight control position $\delta$ and the flight control command at the time t.

The parameter A is maintained to a constant value before the time t, is changed to a limitation value after the time t, and then is maintained to be constant to the limitation value. In the present embodiment, the control surface actuator 35 drives the control surface 50 in response to the inner loop command which is generated based on the flight control position $\delta$. For example, the control surface actuator 35 drives the control surface 50 in response to the inner loop command which depends on the time change rate of the flight control position $\delta$, such that the drive amount of the control surface 50 decrease when the flight control position $\delta$ is changed fast and quickly. Therefore, it is prevented that the parameter A exceeds the limitation value in the transient response. In the present embodiment, because the pilot maintains the flight control position $\delta$ of the flight control device 10 to the limitation flight control position $\delta_{lim}$ based on the reaction force change, the parameter A is maintained to be constant to the limitation value in the steady-state response. Because it is prevented that parameter A exceeds a limitation value in the transient response, it is prevented that the aircraft becomes unstable. Moreover, because the parameter A is maintained to be constant to the limitation value in the steady-state response, the operation which utilizes the performance of the aircraft at maximum becomes possible.

[Third Embodiment]

Figure 12:
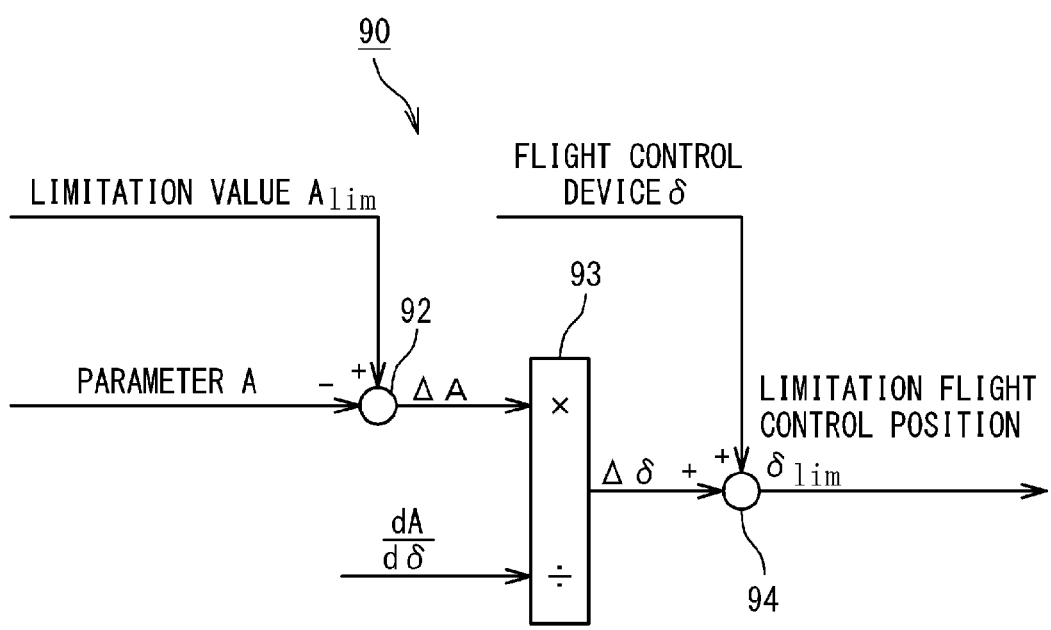
FIG. 12 is a block diagram showing a limitation flight control position calculating section according to a third embodiment of the present invention.

Referring to FIG. 12, the flight control system of the aircraft according to a third embodiment of the present invention will be described. In the flight control system of the aircraft according to the present embodiment, the limitation flight control position calculating section 90 in the flight control system of the aircraft according to the first and second embodiment is replaced by the limitation flight control position calculating section 90 shown in FIG. 12. The limitation flight control position calculating section 90 according to the present embodiment is provided with a subtractor 92, a divider 93 and an adder 94. The limitation flight control position calculating section 90 according to the present embodiment calculates the limitation flight control position $\delta_{lim}$ without using the parameters B and C.

The subtractor 92 subtracts the parameter A from a predetermined limitation value $A_{lim}$ of the parameter A to calculate a parameter difference value $\Delta A$. The divider 93 divides the parameter difference value $\Delta A$ by a rate $dA/d\delta$ indicative of the change amount of the parameter A to the change amount of the flight control position $\delta$ to calculate the flight control position variation $\Delta\delta$. In other words, the divider 93 calculates a product of the reciprocal of the rate $dA/d\delta$ and the parameter difference value $\Delta A$ as the flight control position change amount $\Delta\delta$. The adder 94 adds the flight control position variation $\Delta\delta$ to the flight control position $\delta$ to calculate the limitation flight control position $\delta_{lim}$.

[Fourth Embodiment]

Figure 13:
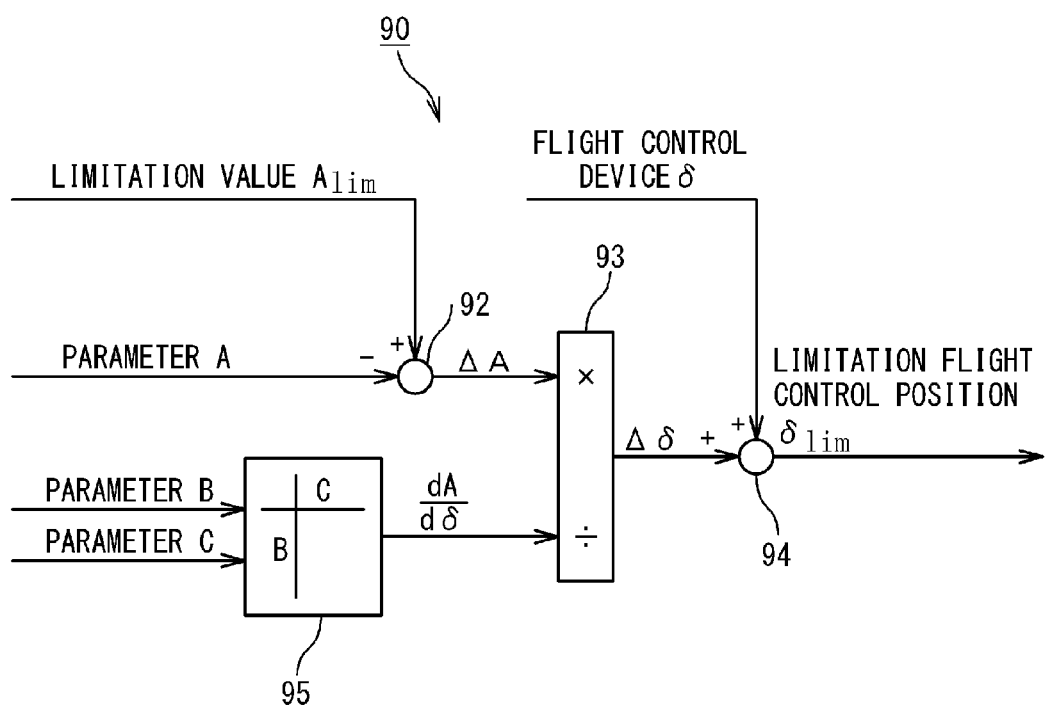
FIG. 13 is a block diagram showing the limitation flight control position calculating section according to a fourth embodiment of the present invention.

Referring to FIG. 13, the flight control system of the aircraft according to a fourth embodiment of the present invention will be described. In the flight control system of the aircraft according to the present embodiment, the limitation flight control position calculating section 90 of the flight control system of the aircraft according to the first or second embodiment is replaced by the limitation flight control position calculating section 90 shown in FIG. 13. The limitation flight control position calculating section 90 according to the present embodiment is provided with a subtractor 92, a divider 93, an adder 94 and a table 95. The table 95 stores a relation of the rate $dA/d\delta$ indicative of a change amount of the parameter A to the change amount of the flight control position $\delta$ and a combination of values of the parameters B and C. The present embodiment is different from the third embodiment in that the rate of the change amount of the parameter A to the change amount of the flight control position $\delta$ changes based on the parameters B and C.

The subtractor 92 subtracts the parameter A from the predetermined limitation value $A_{lim}$ of the parameter A to calculate the parameter difference value $\Delta A$. The divider 93 calculates a flight control position change amount $\Delta\delta$ by using the table 95 and dividing the parameter difference value $\Delta A$ by the rate $dA/d\delta$. In other words, the divider 93 calculates the flight control position change amount $\Delta\delta$ as a product of the reciprocal of the rate $dA/d\delta$ and the parameter difference value $\Delta A$ based on table 95. The adder 94 adds the flight control position change amount $\Delta\delta$ to the flight control position $\delta$ to calculate the limitation flight control position $\delta_{lim}$. Such a calculating method of the limitation flight control position $\delta_{lim}$ is effective when the limitation flight control position $\delta_{lim}$ depends on the parameters B and C in addition to the parameter A.

[Fifth Embodiment]

Figure 14:
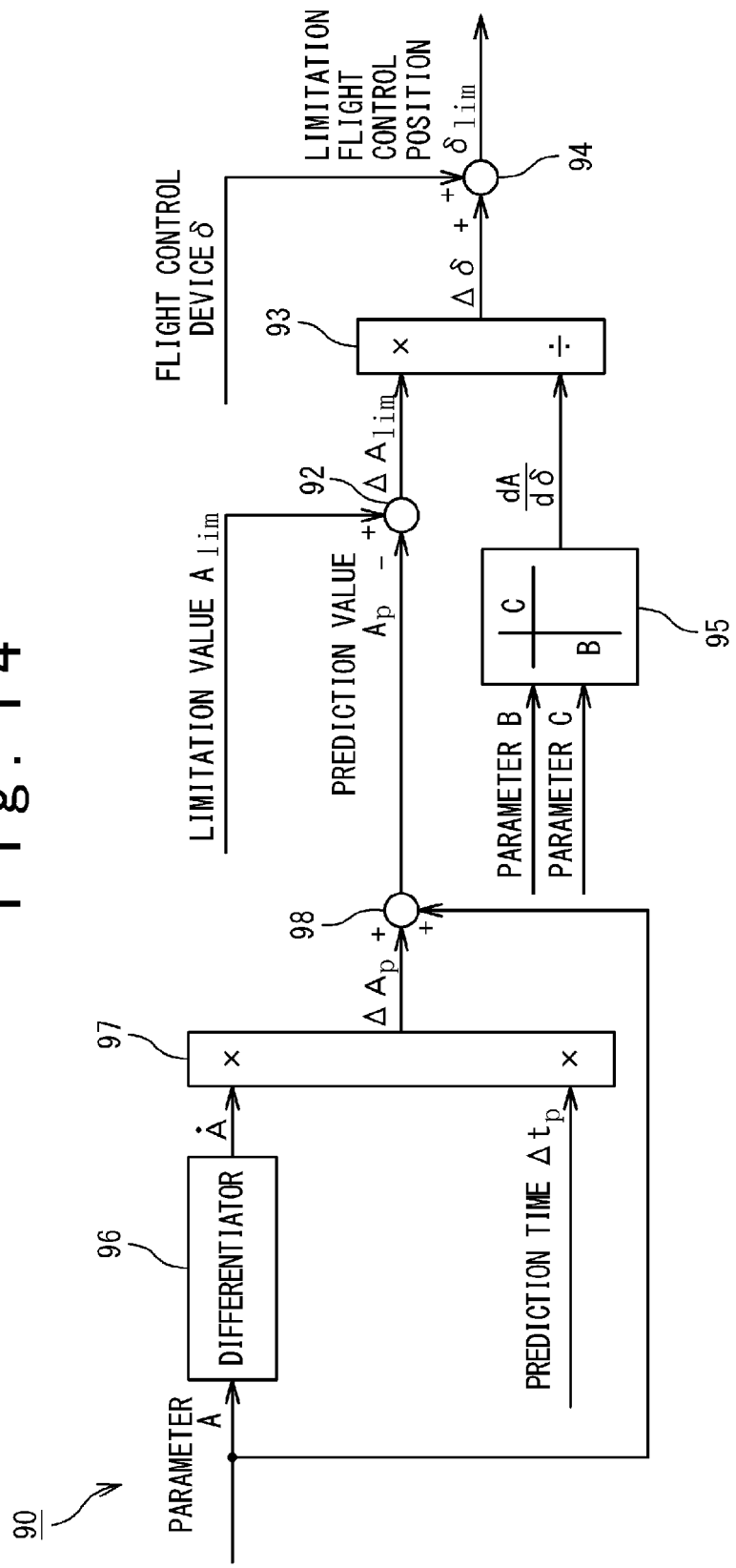
FIG. 14 is a block diagram showing the limitation flight control position calculating section according to a fifth embodiment of the present invention.

Referring to FIG. 14, the flight control system of the aircraft according to a fifth embodiment of the present invention will be described. In the flight control system of the aircraft according to the present embodiment, the limitation flight control position calculating section 90 of the flight control system of the aircraft according to the first or second embodiment is replaced by the limitation flight control position calculating section 90 shown in FIG. 14. The limitation flight control position calculating section 90 according to the present embodiment is provided with a subtractor 92, a divider 93, an adder 94, a table 95, a differentiator 96, a multiplier 97 and an adder 98. The table 95 stores a relation of the rate $dA/d\delta$ indicative of the change amount of the parameter A to the change amount of the flight control position $\delta$ and a combination of the values of the parameters B and C. The present embodiment is different from the fourth embodiment in that a prediction value $A_p$ of the parameter A is supplied to the subtractor 92 instead of the parameter A.

The differentiator 96 differentiates the parameter A with respect to time t to calculate a parameter differential $dA/dt$. The multiplier 97 calculates a parameter change amount $\Delta A_p$ as a product of the parameter differential $dA/dt$ and a predetermined prediction time $\Delta t_p$. The adder 98 adds the parameter change amount $\Delta A_p$ to the parameter A to calculate a parameter prediction value $A_p$ as a prediction value of the parameter A after the prediction time $\Delta t_p$. The subtractor 92 subtracts the parameter prediction value $A_p$ from the predetermined limitation value $A_{lim}$ of the parameter A to calculate a parameter difference value $\Delta A_{lim}$. The divider 93 calculates the flight control position change amount $\Delta\delta$ by dividing the parameter difference value $\Delta A_{lim}$ by the rate $dA/d\delta$ based on table 95. In other words, the divider 93 calculates the flight control position change amount $\Delta\delta$ as the product of the reciprocal of $dA/d\delta$ and the parameter difference value $\Delta A_{lim}$ based on table 95. The adder 94 adds the flight control position change amount $\Delta\delta$ to the flight control position $\delta$ to calculate the limitation flight control position $\delta_{lim}$. The calculating method of the limitation flight control position $\delta_{lim}$ according to the present embodiment is effective when the parameter A changes very fast and quickly, because the limitation flight control position $\delta_{lim}$ is calculated based on the prediction value $A_p$ of the parameter A.

[Sixth Embodiment]

Figure 15:
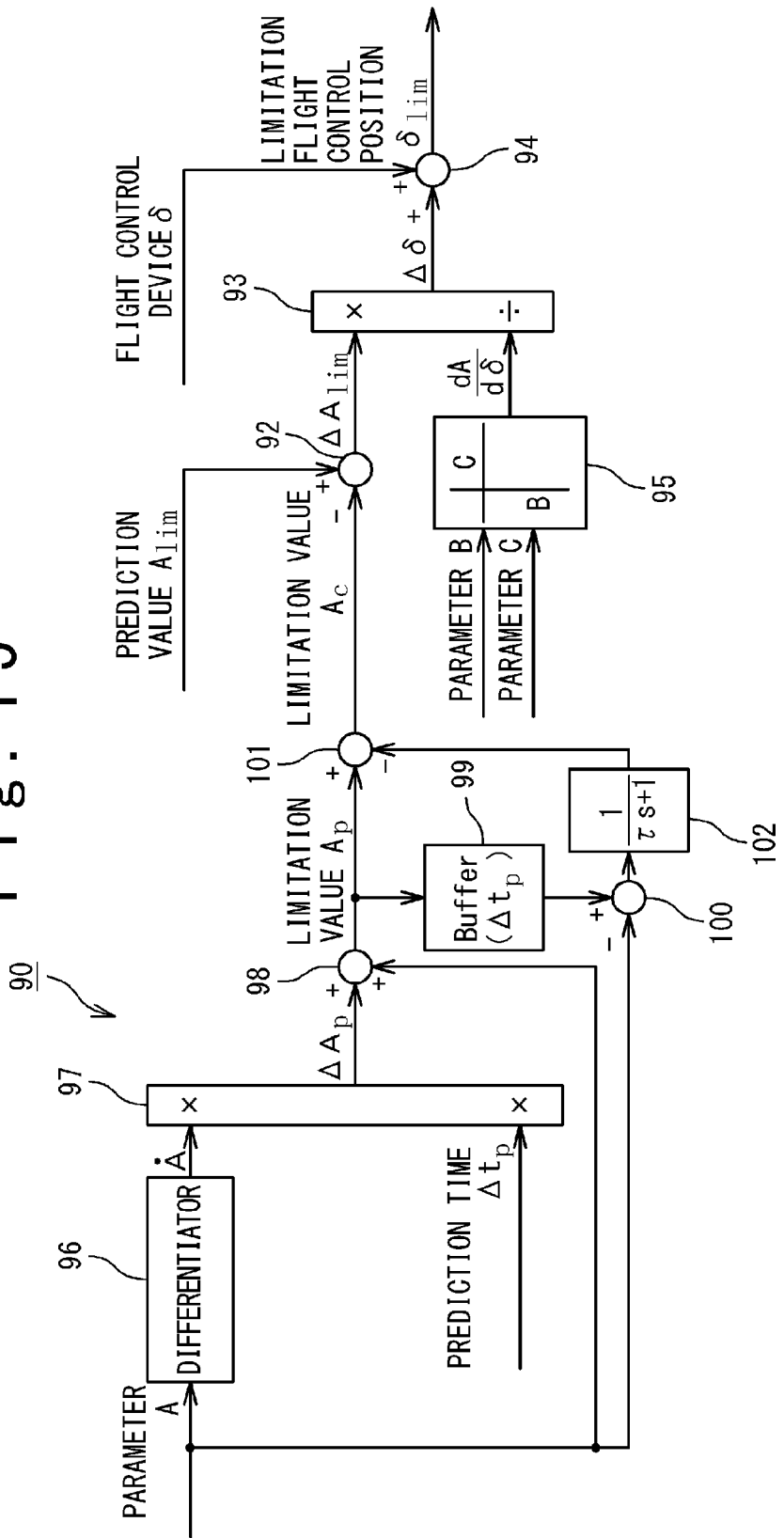
FIG. 15 is a block diagram showing the limitation flight control position calculating section according to a sixth embodiment of the present invention.

Referring to FIG. 15, the flight control system of the aircraft according to a sixth embodiment of the present invention will be described. In the flight control system of the aircraft according to the present embodiment, the limitation flight control position calculating section 90 of the flight control system of the aircraft according to the first or second embodiment is replaced by the limitation flight control position calculating section 90 shown in FIG. 15. The limitation flight control position calculating section 90 according to the present embodiment is provided with a subtractor 92, a divider 93, an adder 94, a table 95, a differentiator 96, a multiplier 97, an adder 98, a buffer 99, a subtractor 100, a subtractor 101 and a first-order lag filter 102. The transfer function $G_{102}(s)$ of the first-order lag filter 102 is expressed by the following equation (2), supposing that the time constant is $\tau$:

$$G_{102}(s) = \frac{1}{\tau s + 1} \quad (2)$$

The table 95 stores a relation of the rate $dA/d\delta$ indicative of the change amount of the parameter A to the change amount of the flight control position $\delta$ and a combination of the values of the parameters B and C. The present embodiment is different from the fifth embodiment in that a correction value $A_c$ obtained by correcting the prediction value $A_p$ is supplied to the subtractor 92 instead of prediction value $A_p$.

The differentiator 96 differentiates the parameter A with respective to time to calculate the parameter differential $dA/dt$. The multiplier 97 calculates the parameter change amount $\Delta A_p$ as a product of the parameter differential $dA/dt$ and a predetermined prediction time $\Delta t_p$. The adder 98 adds the parameter change amount $\Delta A_p$ to the parameter A to calculate the parameter prediction value $A_p$ as the prediction value of the parameter A after the prediction time $\Delta t_p$. The subtractor 100 calculates a prediction error by subtracting the parameter A from the output of the buffer 99 receiving the parameter prediction value $A_p$. Here, a retention time of the buffer 99 is the prediction time $\Delta t_p$. The subtractor 101 calculates the parameter correction value $A_c$ by subtracting the output of the first-order lag filter 102 receiving the prediction error calculated by the subtractor 100 from parameter prediction value $A_p$. The subtractor 92 subtracts the parameter correction value $A_c$ from the predetermined limitation value $A_{lim}$ of the parameter A to calculate a parameter difference value $\Delta A_{lim}$. The divider 93 calculates the flight control position change amount $\Delta\delta$ by dividing the parameter difference value $\Delta A_{lim}$ by the rate $dA/d\delta$ based on table 95. In other words, the divider 93 calculates the flight control position change amount $\Delta\delta$ as a product of the reciprocal of the rate $dA/d\delta$ and the parameter difference value $\Delta A_{lim}$ based on the table 95. The adder 94 adds the flight control position change amount $\Delta\delta$ to the flight control position $\delta$ to calculate the limitation flight control position $\Delta_{lim}$. According to the present embodiment, the prediction value $A_p$ of the parameter A is corrected based on the prediction error.

As described above, the cases where the flight control system according to the above embodiments is applied to the helicopter have been described. However, the flight control system according to the above embodiments may be applied to a fixed-wing aircraft.

The limitation flight control position calculating section 90, the inner loop command calculating section 110, the reaction force generating command calculating section 120, the flight control calculating section 140, and the control surface command calculating section 150 may be realized as an electric circuit board, or may be realized as functions by the control unit 80 or 85 as the computer executing a computer program.

In each of the above embodiments, the flight control position $\delta$ of the flight control device 10 may be detected by using a flight control position sensor (not shown) instead of the reaction force generating actuator 20.

The invention claimed is:

1. A flight control system of an aircraft, comprising:
   a flight control device;
   a sensor configured to detect a first parameter as at least one of a plurality of parameters changed based on a flight condition of the aircraft;
   a limitation flight control position calculating section configured to calculate a limitation flight control position of said flight control device when said first parameter reaches a limitation value, based on the detection result of said sensor;
   a reaction force generating command calculating section configured to generate a reaction force generating command based on a flight control position of said flight control device and said limitation flight control position;
   a reaction force generating actuator configured to change a reaction force which a pilot receives when carrying out a flight control input to said flight control device, in response to said reaction force generating command;
   an inner loop command calculating section configured to generate an inner loop command based on said flight control position; and
   a control surface actuator configured to drive a control surface of said aircraft in response to a control surface command obtained from said flight control position and said inner loop command.

2. The flight control system according to claim 1, wherein said inner loop command calculating section generates said inner loop command to depend on a time change rate of said flight control position and to decrease a drive amount of said control surface.

3. The flight control system according to claim 2, further comprising:
   an inner loop actuator configured to operate in response to said inner loop command,
   wherein said control surface actuator drives said control surface in response to said control surface command which is obtained from said flight control position and an output displacement as an operation result of said inner loop actuator.

4. The flight control system according to claim 2, further comprising:
   a flight control calculating section; and
   a control surface command calculating section, wherein said flight control calculating section generates a flight control command based on said flight control position, and wherein said control surface command calculating section generates said control surface command by subtracting said inner loop command from said flight control command.

5. The flight control system according to claim 1, wherein said sensor detects said plurality of parameters, and wherein said limitation flight control position calculating section calculates said limitation flight control position based on a table which indicates a relation of a combination of values of said plurality of parameters and said limitation flight control position.

6. The flight control system according to claim 1, wherein said limitation flight control position calculating section calculates a flight control position change amount based on a difference between said limitation value and said first parameter and a rate of a change amount of said first parameter to a change amount of said flight control position, and calculates said limitation flight control position based on said flight control position change amount and said flight control position.

7. The flight control system according to claim 6, wherein said sensor detects said plurality of parameters, and wherein said limitation flight control position calculating section calculates said flight control position change amount based on said difference, said plurality of parameters, and a table which indicates a relation of a combination of values of said plurality of parameters and said rate.

8. The flight control system according to claim 1, wherein said sensor detects said plurality of parameters, and wherein said limitation flight control position calculating section:

calculates a first parameter prediction value as a prediction value of said first parameter after a given prediction time, calculates said flight control position change amount based on a difference between said limitation value and said first parameter prediction value, said plurality of parameters, a table which indicates a relation of a combination of values of said plurality of parameters and a rate of a change amount of said first parameter to a change amount of said flight control position, and calculates said limitation flight control position based on said flight control position change amount and said flight control position.

9. The flight control system according to claim 1, wherein said sensor detects said plurality of parameters, and wherein said limitation flight control position calculating section:

calculates a first parameter prediction value as a prediction value of said first parameter after a given prediction time, calculates a first parameter correction value as a correction value of said first parameter prediction value based on said first parameter prediction value, said first parameter, a buffer in which said prediction time is set as a retention time, and a filter, calculates said flight control position change amount based on a difference between said limitation value and said first parameter correction value, said plurality of parameters, and a table which indicates a relation of a combination of values of said plurality of parameters and a rate of a change amount of said first parameter to a change amount of said flight control position, and calculates said limitation flight control position based on said flight control position change amount and said flight control position.

10. A flight control method of an aircraft, comprising:

detecting by a sensor, a first parameter as at least one of a plurality of parameters changed based on a flight condition of said aircraft;

calculating a limitation flight control position of a flight control device when said first parameter reaches a limitation value, based on the detection result of said sensor;

generating a reaction force generating command based on a flight control position of said flight control device and said limitation flight control position;

changing reaction force which a pilot receives when carrying out a flight control input to said flight control device, in response to said reaction force generating command;

generating an inner loop command based on said flight control position;

driving a control surface of said aircraft in response to the control surface command obtained from said flight control position and said inner loop command.

11. The flight control method according to claim 10, wherein said generating an inner loop command comprises:

generating said inner loop command to depend on a time change rate of said flight control position and to decrease a drive amount of said control surface.

12. The flight control method according to claim 11, wherein said flight control device is connected with said control surface through said inner loop actuator and said control surface actuator, and wherein said driving a control surface comprises:

driving said inner loop actuator in response to said inner loop command; and driving said control surface by said control surface actuator in response to said control surface command obtained from an output displacement as the driving result of said inner loop actuator and said flight control position.

13. The flight control method according to claim 11, further comprising:

generating a flight control command based on said flight control position; and generating said control surface command by subtracting said inner loop command from said flight control command.

14. The flight control method according to claim 10, wherein said detecting comprises detecting said plurality of parameters, and wherein said calculating a limitation flight control position comprises:

calculating said limitation flight control position based on a table which indicates a relation of a combination of values of said plurality of parameters and said limitation flight control position.

15. The flight control method according to claim 10, wherein said calculating a limitation flight control position comprises:

calculating a flight control position change amount based on a difference of said limitation value and said first parameter, and a rate of a change amount of said first parameter to a change amount of said flight control position; and calculating said limitation flight control position based on said flight control position change amount and said flight control position.

16. The flight control method according to claim 15, wherein said detecting comprises detecting said plurality of parameters, and
   wherein said calculating a flight control position change amount comprises:
   calculating said flight control position change amount based on said difference, said plurality of parameters, and a table which indicates a relation of a combination of values of the plurality of parameters and said rate.

17. The flight control method according to claim 10, wherein said detecting comprises detecting said plurality of parameters, and
   wherein said calculating a limitation flight control position comprises:
   calculating a first parameter prediction value as a prediction value of said first parameter after a given prediction time;
   calculating a flight control position change amount based on a difference between said limitation value and said first parameter prediction value, said plurality of parameters, and a table which indicates a relation of a combination of values of said plurality of parameters and a rate of a change amount of said first parameter to a change amount of said flight control position; and
   calculating said limitation flight control position based on said flight control position change amount and said flight control position.

18. The flight control method according to claim 10, wherein said detecting comprises detecting said plurality of parameters, and
   wherein said calculating a limitation flight control position comprises:
   calculating a first parameter prediction value as a prediction value of said first parameter after a given prediction time;
   calculating a first parameter correction value as a correction value of said first parameter prediction value based on said first parameter prediction value, said first parameter, a buffer in which said prediction time is set as a retention time, and a filter;
   calculating a flight control position change amount based on a difference between said limitation value and said first parameter correction value, said plurality of parameters, a table which indicates a relation of a combination of values of said plurality of parameters and a rate of a change amount of said first parameter to a change amount of said flight control position; and
   calculating said limitation flight control position based on said flight control position change amount and said flight control position.

* * * * *